United States Patent [19]
Albers et al.

[11] Patent Number: 5,613,054
[45] Date of Patent: Mar. 18, 1997

[54] VIDEO GRAPHICS CONTROLLER WITH IMPROVED CALCULATION CAPABILITIES

[75] Inventors: Thomas M. Albers; John V. Eberst; Darwin Fontenot; Richard L. Pyra, all of Houston; Mark W. Welker; Paul B. Wood, both of Spring, all of Tex.; Jack E. Bresenham, Rock Hill, S.C.

[73] Assignee: Compaq Computer Corporation, Houston, Tex.

[21] Appl. No.: 520,040

[22] Filed: Aug. 28, 1995

Related U.S. Application Data

[63] Continuation of Ser. No. 260,607, Jun. 15, 1994, abandoned, which is a continuation of Ser. No. 822,992, Jan. 21, 1992, abandoned.

[51] Int. Cl.⁶ .................................................. G06F 15/00
[52] U.S. Cl. ................................................................ 395/143
[58] Field of Search .................................. 395/141, 142, 395/143; 345/16, 17, 18, 135, 136; 364/200 MS File, 900 MS File

[56] References Cited

U.S. PATENT DOCUMENTS

| | | | |
|---|---|---|---|
| 4,193,122 | 3/1980 | Bowers | 364/900 |
| 4,593,372 | 6/1986 | Bandai et al. | 364/719 |
| 4,593,377 | 6/1986 | Mitsuka | 364/900 |
| 4,677,573 | 6/1987 | Brown et al. | 364/521 |
| 4,808,986 | 2/1989 | Mansfield et al. | 340/747 |
| 4,987,553 | 1/1991 | Oneda et al. | 395/143 |
| 5,068,802 | 11/1991 | Miyashita et al. | 395/133 |

FOREIGN PATENT DOCUMENTS 2207839  2/1989  United Kingdom.

OTHER PUBLICATIONS

"Algorithm for Computer Control of a Digital Plotter", by J.E. Bresenham, IBM Systems Journal, vol. 4, No. 1, 1965, pp. 25–30.

"Ambiguities in Incremental Line Rastering", J. E. Bresenham, IEEE Computer Graphics & Applications, vol. 7, No. 1, Jan. 1987, pp. 31–43.

"Raster Graphics Drawing Hardware", Bowater et al., IBM Technical Disclosure Bulletin, vol. 27, No. 8, Jan. 1985, pp. 4618–4622.

*Primary Examiner*—Phu K. Nguyen
*Attorney, Agent, or Firm*—Vinson & Elkins L.L.P.

[57] ABSTRACT

Line draw circuitry receives parameters defining first and second endpoints of a line and calculates line parameters based on the first and second endpoints. The line parameters are then stored in a memory. A "calculate-only" control signals determines whether a line is drawn immediately after calculation (and storing) of the end parameters or whether the line is drawn responsive to a subsequent "start" signal. If the line is to be drawn responsive to the start signal, the line parameters may be modified prior to drawing the line.

21 Claims, 4 Drawing Sheets

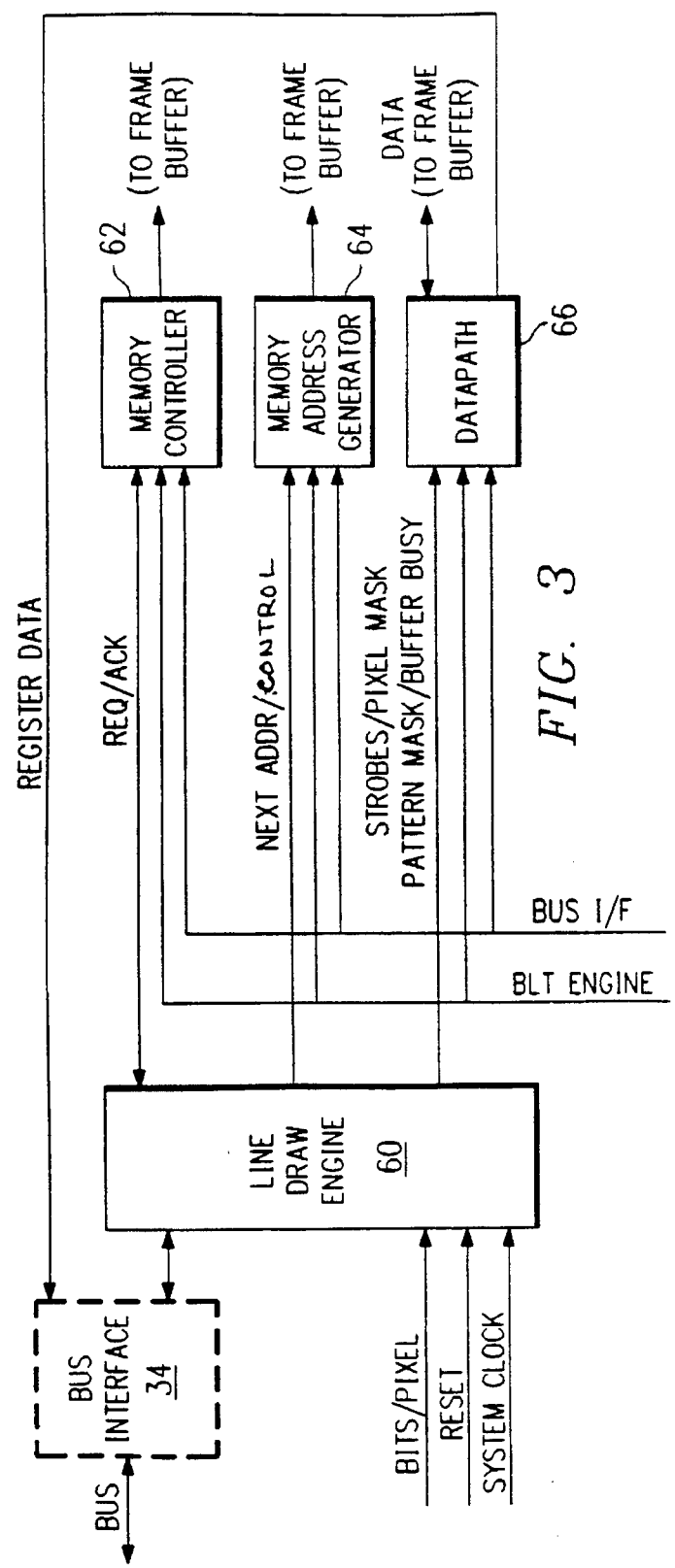

VIDEO GRAPHICS CONTROLLER WITH IMPROVED CALCULATION CAPABILITIES

RELATED APPLICATIONS

This application is a continuation of application Ser. No. 08/260,607, filed Jun. 15, 1994, and entitled "Video Graphics Controller With Improved Calculation Capabilities", now abandoned, which is a continuation of application Ser. No. 07/822,992, filed Jan. 21, 1992, and entitled "Video Graphics Controller With Improved Calculation Capabilities", now abandoned.

TECHNICAL FIELD OF THE INVENTION

This invention relates in general to computers, and more particularly to a graphics processor with improved calculation capabilities.

BACKGROUND OF THE INVENTION

In order to communicate with a user, a computer must be able to output information to a display.

In a graphics system, the display is defined by an array of pixels. For example, in a standard-mode VGA (Video Graphics Adapter) system, the screen is addressed as an array of 640×480 pixels. Each pixel on the display may be set to a desired color from a defined palette. Typically 16 or 256 color palettes are supported. The number of pixels which may be displayed is defined by the graphic subsystem. Typical VGA modes support 640×480, 800×600, and 1024×768 resolutions. VGA modes with resolution greater than 640×480 are generally referred to as "super VGA".

Many of today's application programs are graphics intensive. For example, a computer-aided design program, such as AUTOCAD by AutoDesk, Inc., Sauseleto, Calif., may spend a substantial amount of time drawing a figure to the screen. In some cases, even a small change in the drawing will require the entire drawing to be redrawn. Consequently, the ability of the graphics processor to draw lines quickly becomes of critical importance.

The problems associated with line drawing have been well documented for a number of years. Many of these problems are addressed in an article "Ambiguity in Incremental Line Rastering", by Jack E. Bresenham, IEEE CG&A, May, 1987, which is incorporated by reference herein. The Bresenham article describes problems in drawing a line using an array of pixels, since lines having real values between two discrete pixels will have to approximated using one pixel or the other. Because of the inaccuracies inherent in approximating the line, issues concerning the retraceability of lines and the handling symmetric figures made up of polylines become important. Consequently, the flexibility of a graphics processor, i.e., the ability of the graphics processor to facilitate modification of the line drawing parameters is highly desirable.

Therefore, a need has arisen in the industry for a graphics processor which provides fast and flexibility processing of lines and polylines.

SUMMARY OF THE INVENTION

In accordance with the present invention, a method and apparatus for increasing the speed and flexibility of line drawing in a graphics processor is provided which eliminates substantial problems with the prior art.

Circuitry is provided for receiving parameters defining first and second endpoints of a line. Line parameters are calculated based on the first and second endpoints. The CPU, under control of the host program, may modify the calculated parameters. Thereafter, a line is drawn based on the calculations.

The present invention provides significant advantages over the prior art. Because the CPU may modify the parameters before the line is draw by the line draw engine, significant flexibility is provided by the graphics processor. The CPU may, for example, adjust the parameters to generate a desired pattern, to vary the length of the line, or to cure a slope-related problem.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a block diagram of the portion of the graphics processor involved in line processing;

FIGS. 4a–d illustrate examples of different line possibilities using discrete pixels;

DETAILED DESCRIPTION OF THE INVENTION

The preferred embodiment of the present invention and its advantages are best understood by referring to FIGS. 1–10 of the drawings, like numerals being used for like and corresponding parts of the various drawings.

System Configuration

Figure 1:
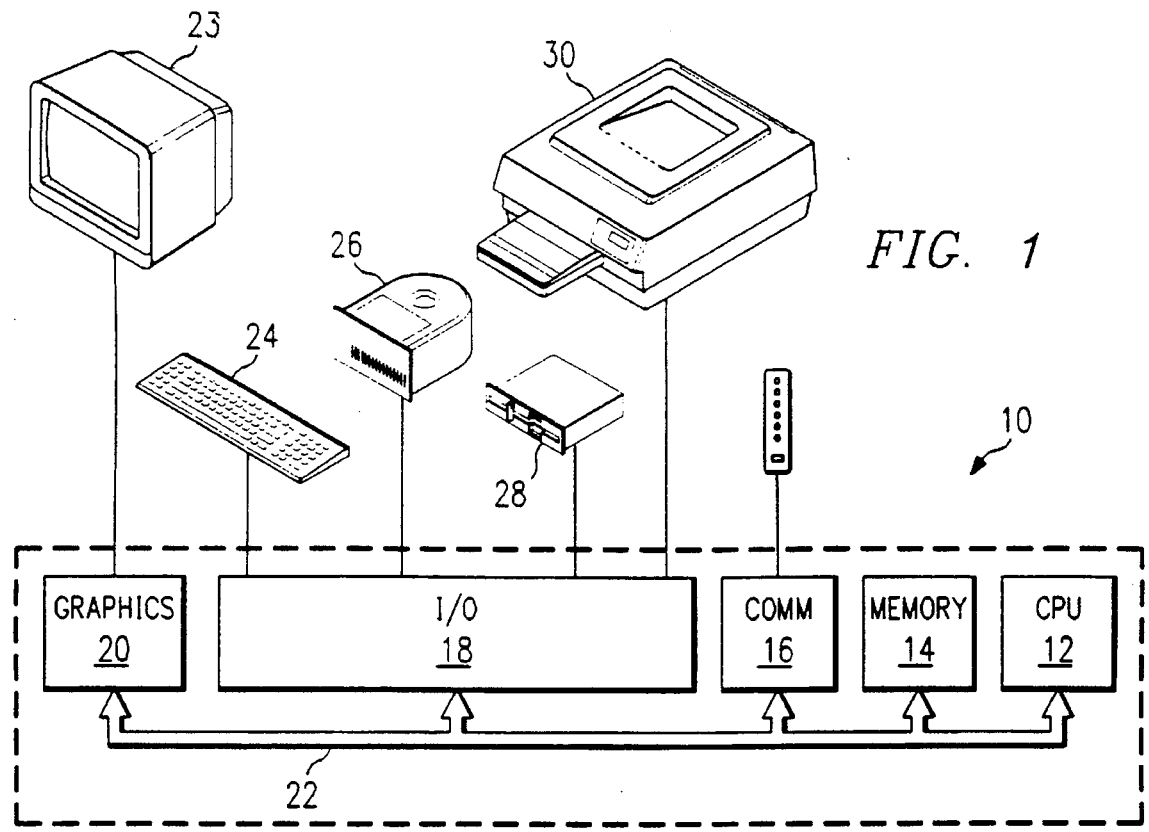
FIG. 1 illustrates a block diagram of a typical computer system.

FIG. 1 illustrates a block diagram of the general architecture of a typical computer system. The computer system 10 comprises a CPU 12, memory 14, communications interface 16, input/output (I/O) interface 18 and graphics circuitry 20. The various subsystems 12–20 communicate over a bus 22. The graphics subsystem 20 outputs data to a display 23, the I/O subsystem 18 communicates with keyboard 24, hard disk 26, floppy disk 28, and printer 30. Communications subsystem 16 transmits and receives data over telephone lines. While the computer system of FIG. 1 illustrates many of the components of a typical computer system, other components, such as CD-ROMs, sound processing cards, and so on, may also be utilized in the computer system 10.

Graphics Subsystem

Figure 2:
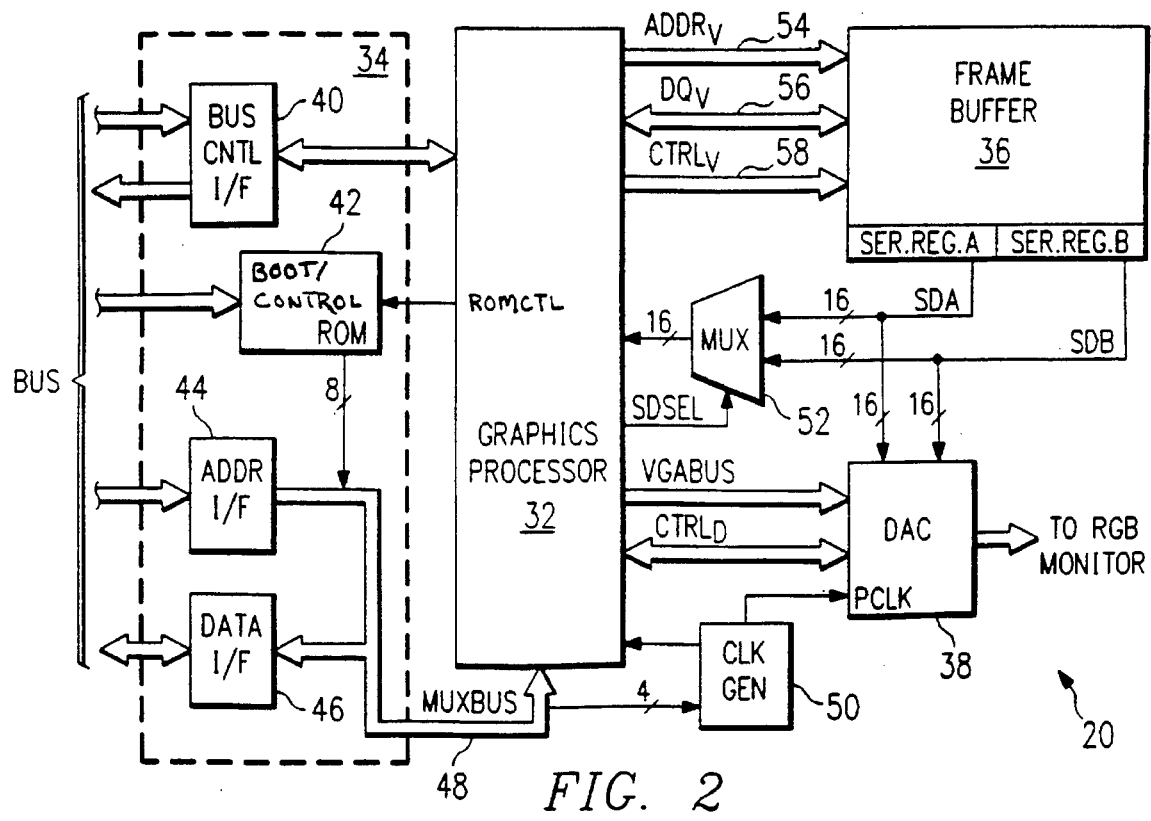
FIG. 2 illustrates a block diagram of the graphics subsystem of the present invention.

FIG. 2 illustrates a block diagram of the graphics subsystem 20. The graphics subsystem 20 comprises graphics processor 32, which is coupled to bus interface circuitry 34, frame buffer memory subsystem 36 and digital-to-analog (DAC) subsystem 38. The bus interface 34 comprises bus control interface 40, Boot/Control ROM 42, address interface 44 and data interface 46. Bus control interface 40 is coupled directly to the graphics processor 32. Boot/Control ROM 42, address interface 44 and data interface 46 are coupled to the graphics processor via bus 48. Boot/Control ROM 42 is enabled via graphics processor 32. Bus 48 is also coupled to clock generator 50 which provides a clock signal to the DAC 38. DAC 38 is also coupled to graphics processor 32 and to the serial shift registers of frame buffer 36. The serial shift registers of frame buffer 36 are also coupled to graphics processor 32 via multiplexer 52. Frame buffer 36 receives address, data and control signals from graphics processor 36 over address bus 54, data bus 56, and control bus 58, respectively. Frame buffer 36, in the preferred embodiment, comprises a plurality of video RAMs (VRAMs) arranged in two banks (A and B), each bank comprising four planes. Each plane provides an 8-bit pixel; thus, each bank outputs data in 32-bit words.

The frame buffer 36 stores the pixel data for each addressable location on the screen. The serial shift registers of the frame buffer memory system 36 serially output the pixels to the DAC 38, which converts the digital value of each pixel to an appropriate signal for display by the monitor.

Line Draw Facility

An important aspect of the graphics processor 32 is the line draw facility. A block diagram of the portion of the graphics processor involved in line processing is illustrated in connection with FIG. 3. A line draw facility 60 is coupled to memory controller 62, memory address generator 64, datapath circuitry 66, and bus interface 34. The memory controller 62 receives memory cycle requests from the line draw facility 60, Bit Block Transfer (BLT) engine (not shown) and bus interface 34 and supplies control signals (RAS, CAS, OE and WE) to the frame buffer 36 responsive thereto. The memory controller 62 also provides acknowledge signals to the requesting component.

The memory address generator 64 supplies the appropriate addresses based on control inputs from the line draw facility 60, BLT engine and bus interface 34, and outputs addresses to the frame buffer 36.

The datapath circuitry 66 enables communication with the frame buffer under control of the memory controller 62, which arbitrates between requests from the line draw facility 60, BLT engine and bus interface 34 (which passes data requests to and from the CPU 12). The datapath circuitry 66 receives mask and control signals from the line draw facility 60 and transfers and receives data to and from the frame buffer 36. The CPU may also read from and write to registers in the line draw facility 60 via the bus interface.

The graphics processor 32 provides control signals to the line draw facility 60 including a system clock signal, a reset signal, and the number of bits per pixel.

The line draw facility 60 enhances the performance of the graphics processor while drawing lines by off-loading calculations from the CPU 12 and computing the individual pixel addresses constituting a line in the line draw facility 60. In the preferred embodiment, the line draw facility 60 is based on the Bresenham line drawing algorithm described in detailed in J. E. Bresenham, "Algorithm for Computer Control of a Digital Plotter", IBM Systems J., Jan. 1965, pp. 25–30. The following C language program describes computation of the Bresenham parameters. In this program, "x0" and "y0" are the coordinates of the starting point of the line, "x1" and "y1" are the coordinates of the ending point of the line, and "Const1", "Const2" and "error" are line parameters calculated as part of the Bresenham algorithm.

TABLE I

LINE DRAW ALGORITHM

```
void line_function( )
int x0, y0, x1, y1
{
int dx, dy, Const1, Const2, error, x, y, length;
int x_is_major, inc_x, inc_y;
    dx = abs(x1 - x0); /* Calculate the variables */
    dy = abs(y1 - y0);
    x_is_major = (dx >= dy);
    inc_x = (x1 > x0);
    inc_y = (y1 > y0);
    if (x_is_major)
    {
    Const1 = dy << 1;    /* '<<' is shift left. It is the
    same as *2 */
    Const2 = Const1 - (dx << 1);
    Length = dx + 1;
    error = Const1 - dx;
    }
    else
    {
    Const1 = dx << 1;
    Const2 = Const1 - (dy << 1);
    length = dy + 1;
    error = Const1 - dy;
    }
    x = x0; y = y0;
    SetPixel( x, y, Color);   /* Turns on first pixel */
    while (--length > 0)
    {
    if (x_is_major)
        if (inc_x)
            x++;
        else
            x--;
    else
        if (inc y)
            y++;
        else
            y--;
if (error < 0)
    error += Const1;
else
    {
    if (x_is_major)
        if (inc_y)
            y++;
        else
            y--;
    else
        if (inc_x)
            x++;
        else
            x--;
    error += Const2;
    }
SetPixel( x, y, Color); /* Turns on a pixel */
}
}
```

The Bresenham algorithm defines each line by four parameters, $X_0, Y_0, X_1, Y_1$ (corresponding to x0, y0, x1 and y1 of the C program defined above). $X_0$ and $Y_0$ define the start point ($P_0$) and $X_1$ and $Y_1$ define the end point ($P_1$). The line draw facility 60 calculates the Bresenham parameters— the line error term ("error" from the C program), $K_1$ (Const1 from the C program) and $K_2$ (Const2 from the C program).

In the preferred embodiment, the line draw facility uses an XY coordinate system with (0,0) being the upper-lefthand corner of the screen. The line draw facility 60 draws pixels of a line by storing an appropriate color code in an address of the frame buffer memory subsystem 36 corresponding to a desired pixel. When the line draw facility 60 draws pixels of a line, it always increments the pixel address in the major direction. The major direction is the X direction if $|X_1-X_0| \geq |Y_1-Y_0|$ and is in the Y direction if $|Y_1-Y_0| > |X_1-X_0|$. The direction which is not the major direction is referred to as the minor direction. The pixel addresses forming a line will always be axial (incremented in the major direction) or diagonal (incremented in both the major and minor directions). The line drawing facility 60 will never write to adjacent pixels in the minor direction within one line drawing operation. Consequently, a line draw from (0,0) to (10,0) will have the same number of pixels as a line that runs from (0,0) to (10,5), even though the second line is geometrically longer by a factor of 1.414. Since both lines have equal magnitudes in the major direction, the number of pixel steps for each line is identical. Examples of different lines drawn in this fashion from (0,0) to (4,2) are illustrated in FIGS. 4a–d.

In FIG. 4a, the pixel steps are DAAD, where "D" defines a diagonal step and "A" defines an axial step. In FIG. 4b, the steps are DADA, in FIG. 4c, the steps are ADDA, and in FIG. 4d, the steps are ADAD. In many instances, the particular pixels implementing the line are unimportant. However, in some instances, such as where parallel lines are drawn, it is desirable to have the same relative pixels addressed for each of the parallel lines. In other instances, the "reversibility" of a line is important. A line is reversible if the pixels comprising the line are the same for both the line drawn from $P_0$ to $P_1$ and the line draw from $P_1$ to $P_0$. The reversibility of the line may be important, for example, where a line is erased by writing the background color to the pixel addresses of a line drawn to $P_1$ to $P_0$. If the line is not reversible, residual pixels will be left after the erasure. Another instance requiring reversibility is where a polygon is traversed in one direction, then traversed in the opposite direction.

Line Draw Registers

Figure 5:
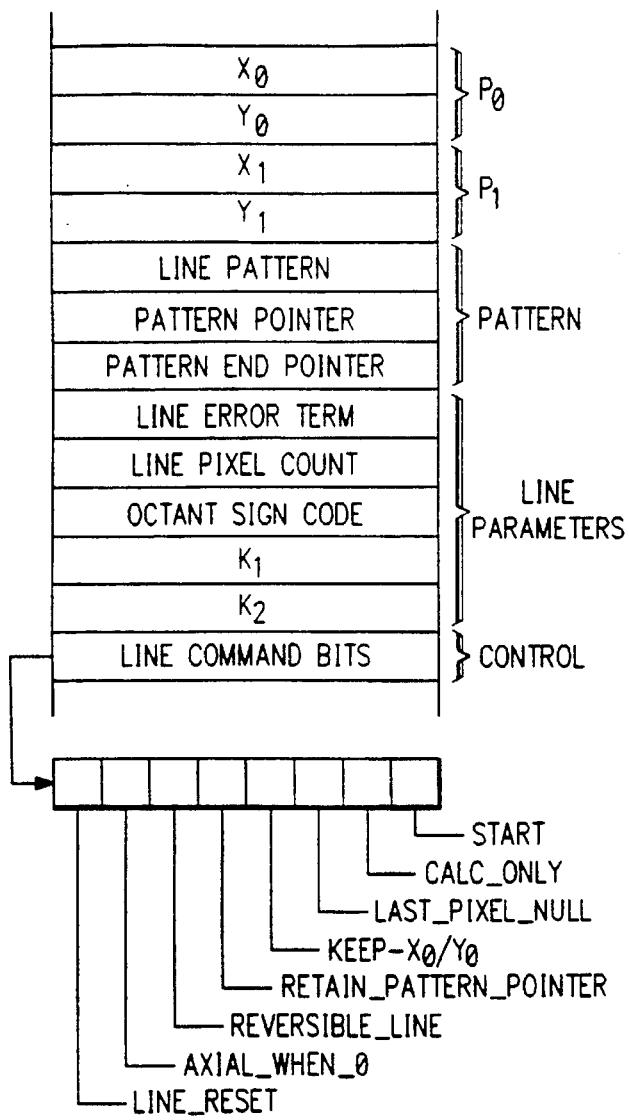
FIG. 5 illustrates a diagram of the registers used in the line draw engine.

FIG. 5 illustrates a diagram of the registers used in the line draw facility 60. The line draw facility 60 includes the $P_0$ coordinate registers ($X_0$, $Y_0$), the $P_1$ coordinate registers ($X_1$, $Y_1$), pattern registers (Line Pattern, Pattern Pointer, Pattern End Pointer), line parameter registers (Line Error Term, Line Pixel Count, Octant, Sign Code, $K_1$ and $K_2$) and a control register (Line Command Bits). Each bit of the Line Command Bits register corresponds to a control code: Start, Calc_Only, Last_Pixel_Null, Keep_X0/Y0, Retain_Pattern_Pointer, Reversible_Line, Axial_When_0, and Line_Reset. Registers are defined below, with addresses as used in connection with a VGA graphics subsystem. Addresses and registers sizes may change upon the implementation of the graphics subsystem.

TABLE II

LINE COMMAND, 3CF.60h (8 bit, R/W)

| BIT | DESCRIPTION |
|---|---|
| 7 | Line_Reset. Toggling this bit (set to 1, then set to 0) places the line draw facility 60 into a known state. It will interrupt a line draw operation if one is executing. This bit must be cleared (set to 0) by the controlling process before using the line draw facility 60 and before setting any other control bits in the register. Specifically, the following state is set: <br> *Line Pattern Register bits set to all 1's. <br> *Pattern Pointer Register set to 31. <br> *Pattern End Pointer Register set to 0. <br> *Constant Register 1(K1) and Constant Register 2(K2) both set to 0. <br> *Line Error Term Register set to 0. <br> *Pixel Count Register set to 0. <br> *Sign codes Register set to 0. <br> *Facility 60 placed in ready state. <br> The datapath state is not affected by setting this bit. |
| 6 | Axial_When_0. This bit provides control for movement in the direction of the minor axis when the computed error term for the next pixel to be drawn equals 0. When set to 1, this bit causes the line draw facility 60 to step only in the direction of the major axis when the error term for the next pixel equals 0. When set to 0, the line draw facility 60 steps in both the major and minor axis direction when the error term for the next pixel equals 0. |
| 5 | Reversible_Line. When this bit is 0, the Axial_When_0 bit controls the line draw facility 60 for the case when the error term equals 0. When this bit is 1 then the Axial_When_0 setting is ignored. Instead, the Sign of Delta X bit in the Sign Codes Register (3CF.63h) controls the action of the line draw facility 60 for the case when the error term equals 0. When the Sign of Delta X bit is 0, then the line draw facility 60 will move in the direction of the minor axis when the error term equals 0. When the Sign of Delta X bit is 1, then the line draw facility 60 only moves in the direction of the major axis when the error term equals 0. |
| 4 | Retain_Pattern_Pointer. This bit specifies that the value of the Pattern Pointer Register is not to be reset to 31 at the end of the next line draw operation. Normally, the Pattern Pointer Register is reset to 31 at the end of each line draw operation. |
| 3 | Keep_X0/Y0. When set to 1, this bit specifies that both X0 and Y0 registers not be updated to the coordinates of the last pixel of the line drawn. Since the Line Pixel Count Register may be modified prior to performing a line draw, the last pixel of a line may have different coordinates then those stored in the $X_1$, $Y_1$ registers. |
| 2 | Last_Pixel_Null. When set to 1, this bit specifies that the last pixel of a line is not to be written to the frame buffer. The values of the Pattern Pointer Register and Line Error Term Register are still set as if the pixel was drawn. |
| 1 | Calc_Only. This bit places the line draw facility 60 in a mode where only the line draw parameters are calculated and the line draw facility 60 stops. Line drawing will not |

TABLE II-continued

LINE COMMAND, 3CF.60h (8 bit, R/W)

| BIT | DESCRIPTION |
|---|---|
|   | proceed automatically in this mode. The line drawing function must be started manually with the Start bit. This mode is used when the line draw parameters error term, pixel count, and major/minor axis sign codes must be accessed. The calculation of parameters based on the settings of the X and Y coordinate registers takes effect only when Y1 is written after this bit is set. |
| 0 | Start. When set to 1, the line draw facility 60 starts drawing a line as defined by the current line draw parameters. This bit also indicates the status of the current line draw operation. It will be set to 0 when the line draw facility 60 has finished drawing the current line. Once started, the line draw facility 60 cannot be aborted except by toggling the Line Reset bit. |

TABLE III

PATTERN POINTER, 3CF.61h (5 bit, R/W)

| BIT | DESCRIPTION |
|---|---|
| 7-5 | Reserved (0). |
| 4-0 | Pattern Pointer. |

The Pattern Pointer register shown in Table III uses a 5-bit value (decimal 1–31) to indicate the bit position in the Line Pattern Register whose contents will be used to generate the next pixel. At reset (including Line Reset) and at the end of each line draw operation, it is reset to 31. During pixel generation, it is decremented by 1 for each pixel count. Resetting of the value to 31 at the end of each line draw operation can be inhibited with the Retain_Pattern_Pointer bit in the Line Command Register.

The value in this register may be set before drawing a line to indicate the bit position in the Line Pattern Register to use when beginning the next line draw operation.

TABLE IV

PATTERN END POINTER, 3CF.62h (5 bit, R/W)

| BIT | DESCRIPTION |
|---|---|
| 7-5 | Reserved (0). |
| 4-0 | Pattern End Pointer. |

The Pattern End Pointer register described in Table IV specifies the effective length of the line pattern by indicating the lower bit position of the Line pattern Register. Thus, if the Pattern End Pointer Register is k, then the pattern bits from 31 to k will be used during line rendering. Its initial value after power-up or reset is 0.

TABLE V

OCTANT SIGN CODE, 3CF.63h (8 bit, Read/Write)

| BIT | DESCRIPTION |
|---|---|
| 7-3 | Reserved. (Write and read back 0's) |
| 2 | Sign of Delta X. (0 = Positive, 1 = Negative) |

TABLE V-continued

OCTANT SIGN CODE, 3CF.63h (8 bit, Read/Write)

| BIT | DESCRIPTION |
|---|---|
| 1 | Sign of Delta Y. (0 = Positive, 1 = Negative) |
| 0 | Major Axis. (Sign of (IDelta XI - IDelta YI)) |

Figure 6:
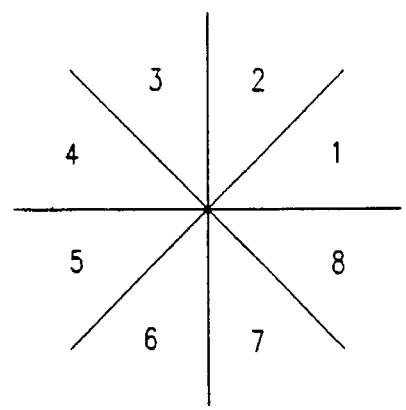
FIG. 6 illustrates a diagram of the octant sign codes.

The Octant Sign Code register described in Table V contains the major/minor axis sign codes, which describes the slope of a line. This register is set by the line draw facility 60 when the Y1 Register is written. FIG. 6 shows the sign code to octant mapping.

TABLE VI

LINE PIXEL COUNT, 3CF.64,65h (16 bit, Read/Write)

| PIXEL COUNT | PIXELS DRAWN | |
|---|---|---|
|  | LPN = 0 | LPN = 1 |
| 0 | 1 | 1 |
| 1 | 2 | 1 |
| 2 | 3 | 2 |
| n | n + 1 | n |

| BITS | DESCRIPTION |
|---|---|
| 15-10 | Don't care. |
| 9-0 | Pixel count (unsigned). |

The Line Pixel Count register described in Table VI contains the pixel count for the line draw facility 60. The value stored in this register is a 10-bit unsigned number interpreted as: "number of pixels to be drawn"−1. This is the difference of the coordinate endpoints of the line for the major axis coordinates. Table VI indicates the number of pixels drawn based on the value of this register and the Last_Pixel_Null (LPN) bit setting. This register is set by the line draw facility 60 when the Y1 Register is written.

TABLE VII

LINE ERROR TERM, 3CF.66,67h (16 bit, R/W)

| BIT | DESCRIPTION |
|---|---|
| 15-12 | Reads back the sign extension of bit 11. |
| 11-0 | Error Term (signed). |

The Line Error Term register defined in Table VII specifies the initial error term to be used by the inner loop of the line draw algorithm. The value is a 12-bit, two's complement quantity for values in the range [−2048–2047]. Negative values are sign extended to bits [15–12] on a read operation. The value is calculated from (2*dMinor−dMajor) where dMinor is the dimension of the minor axis and dMajor is the dimension of the major axis. Programming of this register to draw lines is optional. If not supplied then the hardware will generate the error term required for generation of the line. Setting this register allows the host software initial control of the pixel movement in minor axis direction of line generation. In use, the software would set the value of this register after writing the X and Y coordinate registers when the Calc_Only bit has been set in the Line Command Register. This register is set by the line draw facility 60 when the Y1 Register is written. At the end of a line draw operation, this register gets set to the value of the error term for the last pixel drawn.

TABLE VIII

K1 CONSTANT, 3CF.68,69h (R/W)

| BIT | DESCRIPTION |
|---|---|
| 15-11 | Reserved. (Write and read back zeros.) |
| 10-0 | K1 (unsigned). |

The K1 register described in Table VIII specifies the line draw parameter constant K1. The value K1 is calculated as 2*dMinor where dMinor is the dimension of the minor axis. This is an 11-bit unsigned quantity. This register is set by the line draw facility 60 when the Y1 Coordinate Register is written.

TABLE IX

K2 CONSTANT, 3CF.6A,6Bh (R/W)

| BIT | DESCRIPTION |
|---|---|
| 15-12 | Reads back the sign extension of bit 11. |
| 11-0 | K2 (signed). |

The K2 register described in Table IX specifies the line draw parameter constant K2. the value K2 is calculated as (2*dMinor–2*dMajor) where dMinor is the dimension of the minor axis and dMajor is the dimension of the major axis. This is a 12-bit two's complement signed quantity. On read-back, bit 11 is sign extended to bits 15–12. This register is set by the line draw facility 60 when the Y1 Coordinate Register is written.

TABLE X

X0, 63C0, 1 (16 bit, R/W)

| BIT | DESCRIPTION |
|---|---|
| 15-10 | Don't care. |
| 9-0 | Starting X point (0 > = X0 > = 1023). |

The X0 register described in Table X specifies the X coordinate of the line start point. Legal values are in the range 0 to 1023. On power-up or reset, this register is set to 0. The value in this register is not affected by a Line Reset.

TABLE XI

Y0, 63CX2, 3 (16 bit, R/W)

| BIT | DESCRIPTION |
|---|---|
| 15-10 | Don't care. |
| 9-0 | Starting Y point (0 > = Y0 > = 1023). |

The Y0 register described in Table XI specifies the Y coordinate of the line start point. Legal values are in the range 0 to 1023. On power-up or reset, this register is set to 0. The value in this register is not affected by a Line Reset.

TABLE XII

LINE PATTERN, 83C0, 1,2,3, (32 bit, R/W)

| BIT | DESCRIPTION |
|---|---|
| 31-0 | Line pattern. |

The Line Pattern register described in Table XII denotes the pattern of the line drawn to the frame buffer. A "1" bit in this register specifies that a bit value of 1 is to be written to the datapath and expanded to a pixel. A "1" bit in the Line Pattern Register usually represents foreground color pixel. A "0" bit in this register specifies that a bit value of 0 is to be written to the datapath. A "0" bit usually represents a background color pixel. This register is initialized to 1's on power-up and reset.

TABLE XIII

X1 REGISTER, 83CC,D (16 bit R/W)

| BIT | DESCRIPTION |
|---|---|
| 15-10 | Don't care. |
| 9-0 | Ending X point (0 > = X1 > = 1023). |

The X1 register described in Table XIII specifies the X coordinate of the line end point. Legal values are in the range 0 to 1023. On power-up or reset, this register is set to 0. The value in this register is not affected by a Line Reset.

TABLE XIV

Y1 REGISTER, 83CE,F (16 bit, R/W)

| BIT | DESCRIPTION |
|---|---|
| 15-10 | Don't care. |
| 9-0 | Ending Y point (0 > = Y1 > = 1023). |

The Y1 register described in Table XIV specifies the Y coordinate of the line end point. Legal values are in the range 0 to 1023. On power-up or reset, this register is set to 0. The value in this register is not affected by a Line Reset.

Writing to this register address causes the line draw facility 60 to start automatically. If the Calc_Only bit is set in the Line Draw Command Register, then a write to this address causes the line draw facility 60 to calculate the line draw parameters and then wait. For byte accesses to this register, both bytes must be written to cause the line draw facility 60 to start automatically.

Auto-Start/Calc-Only/Polylines

Figure 7:
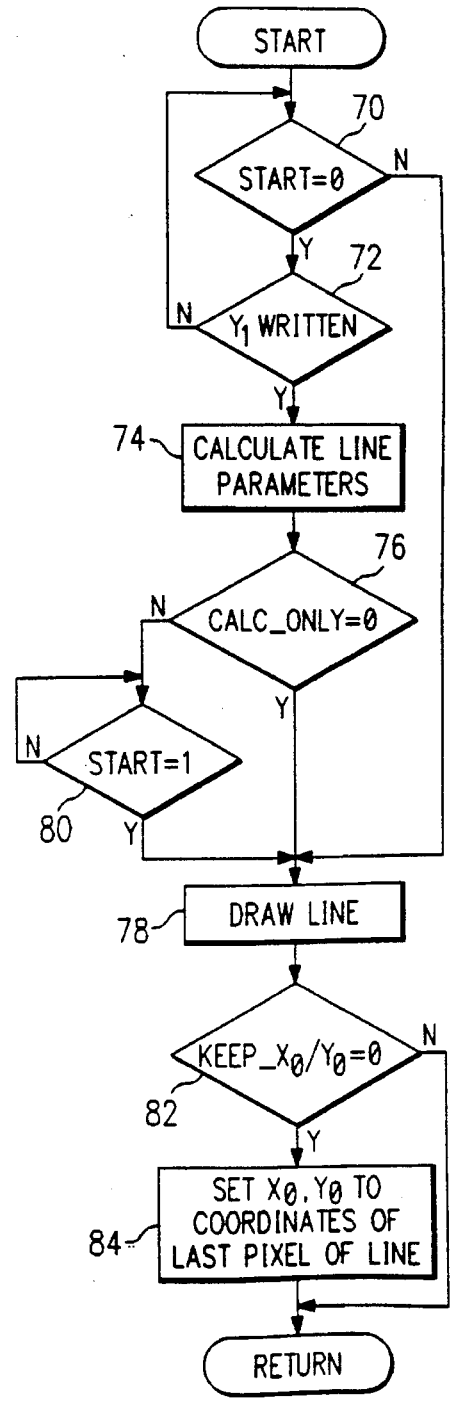
FIG. 7 illustrates a flow chart of the operation of the line draw engine.

The line draw facility 60 provides a number of features which increase the speed and enhance the flexibility of line drawing. FIG. 7 illustrates a flow chart describing the Auto-Start, Calculate-Only and Polyline modes of operation for the line draw facility 60. In decision block 70, the Start bit of the line command register is reviewed. If the start bit is set to "1", the line draw facility 60 begins drawing a line as defined by the current line draw parameters stored in the registers of FIG. 5 If the Start bit is set to "0", then the line draw facility 60 waits until the $Y_1$ coordinate is written to the $Y_1$ register in decision block 72. Thus, the line draw facility 60 waits until either the Start bit is set to "1" (decision block 70) or $Y_1$ is written to the $Y_1$ register (decision block 72). If, in decision block 72, the $Y_1$ coordinate has been written to the $Y_1$ register, then the line parameters described above are calculated in block 74. After the line parameters have been calculated (and stored in the appropriate registers shown in FIG. 5), the line draw facility 60 determines whether the Calc_Only bit is set to "0" in decision block 76. If the Calc_Only bit of the Line Command register is set to "0", the line is drawn in block 78. If the Calc_Only bit is set to "1" in decision block 76, the line draw facility 60 waits until the Start bit of the Line Command register is set to "1" in decision block 80 before drawing the line in block 78. After drawing the line, the line draw facility 60 checks the Keep_X0/Y0 bit in decision block 82. If the Keep_X0/Y0 bit is set to "0", then the $P_1$ coordinates ($X_0$, $Y_0$) are set to the current pixel coordinates, i.e., the last pixel of the line, in block 84. As described below with regard to the Calculate-Only mode, the last pixel of a line may be different than the pixel defined by the $X_1$, $Y_1$ registers. This feature facilitates the drawing of polylines, where a pixel is shared between the last pixel of a first line and the first pixel of a second line.

As described in FIG. 7, the line draw facility 60 provides significant speed and flexibility enhancements. The speed increase is perhaps best understood in connection with FIG. 8 which illustrates a curve drawn as a series of connected lines 86. Each line 86 is bounded by end points 88. In the prior art, the drawing of each line 86 would require at least three bus cycles prior to drawing each line—one bus cycle for writing the $P_0$ coordinate (assuming that $X_0$ and $Y_0$ are written simultaneously), one bus cycle for writing the $P_1$ coordinate, and one bus cycle for instructing the graphics processor to begin the line draw operation. When a number of lines must be drawn, the additional clock cycle for instructing the graphics processor to begin the line draw operation presents a significant overhead. It should be noted that in a high resolution graphics program, the number of lines used to implement a curve would be much greater than that shown in FIG. 8. Thus, the time savings attributable to the Auto-Start feature may be significant.

Figure 8:
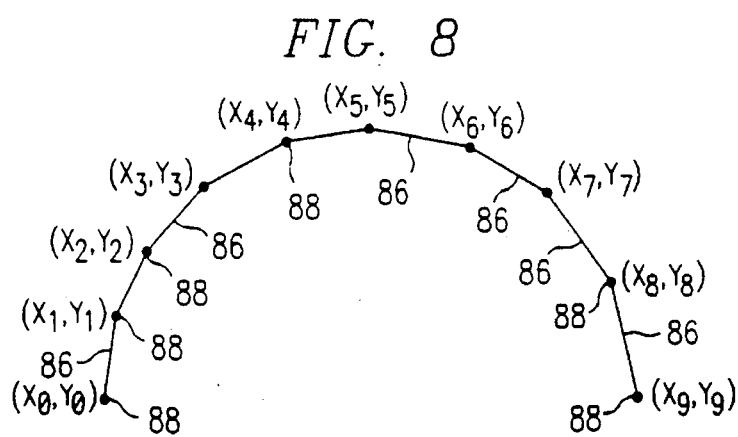
FIG. 8 illustrates a rendering of a curve using multiple line segments.

Further, it should be noted from FIG. 8 that the end points 88 between lines are shared, i.e., the last pixel of one line becomes the first pixel for the next line. The Polyline features, where the last pixel coordinate ($P_1$) is automatically written to the $X_0$ and $Y_0$ registers, further increases the speed of drawing lines. In this mode, in conjunction with the Auto-Start mode, the host program need only write to the $X_1$ and $Y_1$ registers to begin drawing the next line segment. It should be noted that while the $Y_1$ register has been chosen in the illustrated embodiment to initiate the line draw process, either the $X_1$ or $Y_1$ registers could be used for this purpose.

The Calculate-Only mode provides significant flexibility in using the line draw facility 60. As shown in FIG. 7, when the Calc_Only bit is set to "1", the line draw facility 60 calculates the line parameters in block 74, but does not proceed with drawing the line in block 78 until the Start bit is set to "1". This allows the host program to modify the parameters prior to drawing the line. While the preferred embodiment of the line draw facility 60 provides for some adjustment of the method by which the lines are drawn, i.e., through the Axial_When_0 and Reversible_Line controls bits of the Line Command register, there may be instances in which further control of the line draw parameters is desired. The parameters which may be modified in the Calculate-Only mode are the Line Error Term, K1 and K2 Constants, Octant Sign Code and Line Pixel Count. These parameters are held in the registers shown in FIG. 5 and are described hereinabove. The line draw facility 60, in the preferred embodiment, uses these five parameters to draw a line. It should be noted that the end point coordinates ($X_1$, $Y_1$) are not needed to draw the line, but are used to calculate the intermediate parameters. The Line Pattern, Pattern Pointer, and Pattern End Pointer registers are used to determine what value will be written to the frame buffer 36 for each pixel in the line. The pattern functions of the line draw facility 60 are described in greater detail hereinbelow.

The Calculate-Only mode may be used in a variety of operations. For example, it may be desirable to draw a line of a predetermined length using the slope of a line from (0,0) to (20,18) even though the line will not span the entire length between these two coordinates. In the line draw facility 60 of the present invention, the Calc_Only bit could be set to "1" and the coordinates for $P_0$ and $P_1$ could be written to the appropriate registers as (0,0) and (20,18). The line draw facility 60 would then calculate the line parameters upon receiving the $Y_1$ coordinate. Thereafter, the value of the Line Pixel Count register could be modified to set the line to the desired length.

Another use of the Calculate-Only mode would be to bias the line error term based on the octant (stored in the Octant Sign Code register) to modify which pixels are used to implement a given line. Several algorithms exist for implementing reversible lines, and by setting the Line Pixel Count to "1", the Line Error Term register could be modified after each pixel is drawn. The Calculate-Only mode could be use to calculate the parameters and modify the line error term to a desired value. The Calculate-Only mode could also be used to provide CPU generated patterns. For example, a dashed line between two points may be desired, with a solid portion terminating on each of the endpoints. To provide a constant slope to the dashes, the parameters for each dash could be computed using the parameters for the line between the endpoints of the overall line. The CPU would compute the number of pixels of each segment, and adjust the Line Pixel Count register accordingly. With the Keep-X0/Y0 bit set to "0", the $X_0$ and $Y_0$ registers will be set to the end of the segment after it is drawn. The pattern in the pattern register can then be changed (from "111 . . . 111" for the foreground color segments to "000 . . . 000" for the background color segments) and the Line Pixel Count register may be set to the desired length of the blank segment. The blank segment is drawn when the Start bit is set to "1". These steps may be repeated for each segment of the dashed line. For ease of coding, the Last_Pixel_Null bit can be set to "1" and the Line Pixel Count register can be set to a value which is one greater than the number of pixels desired.

A third aspect of the present invention which provides additional flexibility is the ability of the host application to set all of the parameters (except for the $P_1$ registers) and write the parameters to the appropriate registers. By setting the Start bit at block 70, the line will be drawn in block 78 using the values stored in the parameter registers without the intermediate calculation of line parameters in block 74.

Buffering Coordinates

Figure 9:
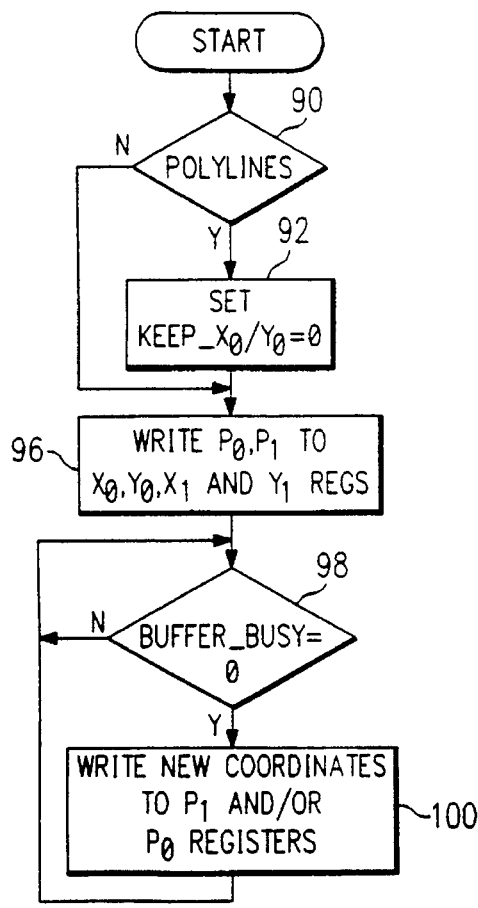
FIG. 9 illustrates a flow chart describing coordinate buffering.

FIG. 9 illustrates a flow chart illustrating the buffering features of the line draw facility 60. In decision block 90, the host application determines whether or not polylines are to be drawn. If so, the Keep_X0/Y0 bit of the Line Command register is set to "0" in block 92, otherwise, if polylines are not to be written, the state of the Keep_X0/Y0 bit is unimportant. In block 96, the $P_0$ and $P_1$ coordinates are written to the $X_0$, $Y_0$, $X_1$ and $Y_1$ registers. The line draw operation will then continue as described in connection with FIG. 7. However, prior to ending the line draw operation, the host application may write the next set of coordinates to the $X_0$, $Y_0$, $X_1$ and $Y_1$ registers prior to the end of the line draw operation. Thus, in decision block 98, the host application checks the Buffer_Busy bit (which is available in Datapath circuitry 66) to determine whether the buffer is busy. The Buffer_Busy bit is set to a "1" when the line draw facility 60 is drawing a line and coordinates have been received by the line draw facility 60 for the next line. If the Buffer_Busy bit is set to "0", the coordinates for the next line may be written to the $P_0$ and $P_1$ registers in block 100. If the operation is a polyline operation, the host application need write only to the $X_1$ and $Y_1$ registers, requiring fewer transactions than the general endpoint line draw case. Otherwise, if the buffer is busy in decision block 98, the host application will wait until the Buffer_Busy bit is set to "0". When buffering, the line draw facility 60 cannot be started manually and the Calculate-Only mode can be initiated, but the contents of the register are not valid until the line draw facility 60 is free.

In normal use, the parameter registers may not be programmed with new values until the line draw facility 60 completes its current operation, forcing a serialization of parameter-writing and line drawing operations. When the line draw facility 60 completes its operation, the Start bit is set to "0". This status bit indicates when the line draw facility 60 may be programmed. However, to use buffering, the software need only check the Buffer_Busy bit, and therefore may set the coordinate registers prior to completion of the line draw operation, providing for an overlap of parameter-writing and line drawing operations.

Patterened Lines

The line draw facility 60 treats all lines as pattern lines. For each pixel in a line, the Line Pattern register determines whether a foreground or background pixel will be written to the frame buffer 36. If the bit in the pattern is a "1", the value stored in a foreground color register (not shown) is written to the frame buffer 36 and if the bit is a "0", the value stored in a background color register (not shown) is written to the frame buffer 36. The foreground and background color registers are located in the datapath circuitry 66.

Figure 10:
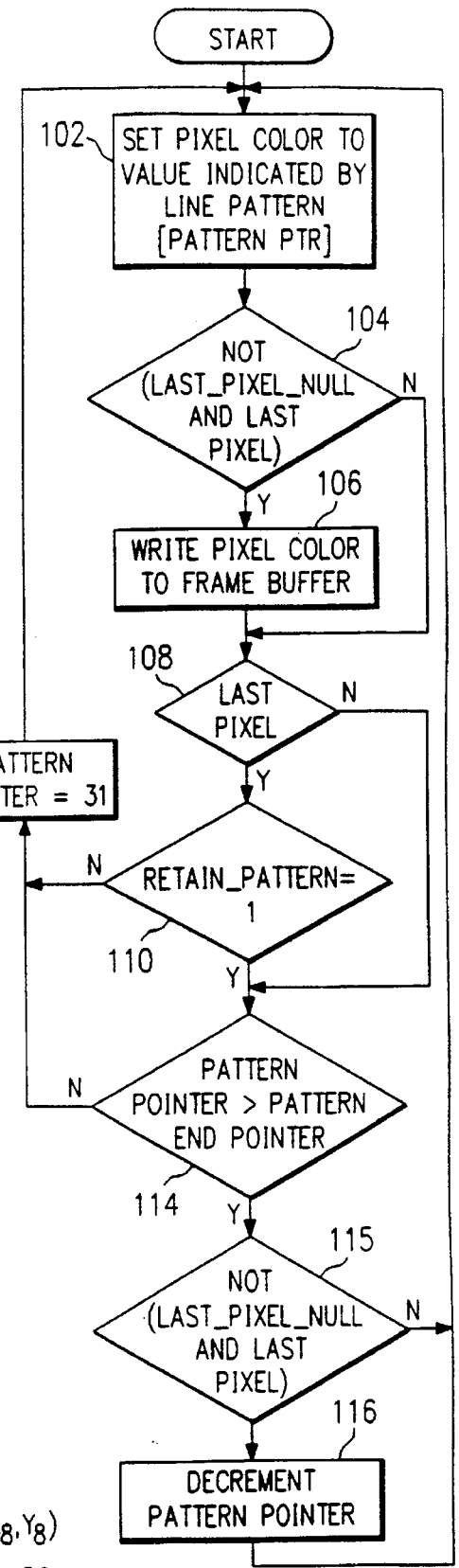
FIG. 10 illustrates a flow chart describing line pattern features.

Operation of the line draw facility 60 with regard to pattern lines is illustrated in connection with FIG. 10. In block 102, the pixel color is set to the value indicated by the bit of the Line Pattern register at the position indicated by the Pattern Pointer register. For a 32-bit line pattern register, the pattern pointer will start at "31" and decrement to "0", under normal operation. In decision block 104, the line draw facility 60 determines whether the Last_Pixel_Null bit of the line command register is set and whether the current pixel is the last pixel in a line. If either the current pixel is not the last pixel in the line or if the Last_Pixel_Null bit is set to "0", then the pixel color determined in block 102 is written to the frame buffer 36 in block 106. As described below, the write to the memory may involve a raster operation. If the Last_Pixel_Null bit is set to "1" and the current pixel is the last pixel, then the line draw facility 60 does not write to the frame buffer 36. In decision block 108, the line draw facility 60 determines whether the current pixel is the last pixel in the line. If the current pixel is the last pixel, the line draw facility 60 checks to see if the Retain_Pattern bit of the Line Command register is set to "0". If so, the Pattern Pointer register is reset to "31" (for a 32-bit Pattern Pointer register) in block 112. If the Retain_Pattern bit is set to "1" in decision block 110, or if the current pixel is not the last pixel in decision block 108, then the line draw facility 60 checks to see whether the value stored in the Pattern Pointer register is greater than the value stored in the Pattern End Pointer register in decision block 114. If not, the Pattern Pointer register is reset to "31" in block 112. If the value stored in the Pattern Pointer register is greater than the value stored in the Pattern End Pointer register in decision block 114 and if the current pixel is not the last pixel of a line with the Last_Pixel_Null bit set to "1" in block 115, then the Pattern Pointer register is decremented in block 116. Program control returns to block 102 where the next pixel in the line is set to the value indicated by the bit in the Line Pattern register indicated by the new value of the Pattern Pointer register. If the current pixel is the last pixel of the line and the Last_Pixel_Null bit is set to "1", then the Pattern Pointer register is not decremented.

The Pattern End register provides cycling of bits comprising all or part of the Line Pattern register. For example, a desired pattern may alternate between seven foreground pixels and seven background pixels. In this case, bits 25–31 of the Line Pattern register would be set to "1" and bits 18–24 of the Line Pattern register would be set to "0". The Pattern End Pointer register would be set to "18".

The Retain_Pattern bit specifies whether the pattern will continue over two or more lines. In other words, if the Retain_Pattern bit is set to "1", the pattern defined by the line pattern register and the pattern end pointer will continue over polylines, without resetting the Pattern Pointer register to "31" at the end of each line segment.

The Last_Pixel_Null bit specifies whether the last pixel of a line will be written to the frame buffer 36. The use of this control bit pertains mainly to raster operations polylines, where the last pixel of the first line is the first pixel of the subsequent line. Writing to the frame buffer 36 is controlled by a raster operation code register. The value stored in the raster operation code register defines a logical operation which will be performed on the source pixel (the pixel value determined in block 102) and the corresponding pixel already stored in the frame buffer. If a raster operation is specified, the datapath circuitry performs a read-modify-write operation, wherein the destination pixel is retrieved from memory, the logical operation with the source pixel and the result is stored to the frame buffer.

TABLE XV

Raster Operation Codes

| Register Value | Raster Operation |
| --- | --- |
| 0000 | 0 |
| 0001 | ! (D + S) |
| 0010 | D & (!S) |
| 0011 | !S |
| 0100 | (!D) & S |
| 0101 | !D |
| 0110 | D XOR S |
| 0111 | ! (D & S) |
| 1000 | D & S |
| 1001 | D XNOR S |
| 1010 | D |
| 1011 | D + (!S) |
| 1100 | S |
| 1101 | (!D) + S |
| 1110 | D + S |
| 1111 | 1 |

TABLE XV-continued

Raster Operation Codes

| Register Value | Raster Operation |
|---|---|

Legend: D = Destination
S = Source
! = Not
& = And
+ = Or

Where logical operations are performed on the frame buffer memory, writing to the same pixel location twice may cause unintended effects. Hence, the Last_Pixel_Null status bit prevents the raster operations from being performed twice on a single pixel at the vertices of a polyline.

The present invention provides significant advantages over the prior art. The Auto-Start, Parameter Buffering and Polyline modes significantly increase the speed of which lines may be draw. The Calculate-Only and Pattern pixel operations provide increased flexibility and control in drawing the lines.

Although the present invention and its advantages have been described in detail, it should be understood that various changes, substitutions and alterations can be made herein without departing from the spirit and scope of the invention as defined by the appended claims.

What is claimed is:

1. Circuitry for drawing lines comprised of a plurality of pixels, comprising:

circuitry for receiving parameters defining first and second endpoints of a line;

circuitry for calculating line parameters based on said first and second endpoints, wherein said calculated line parameters include a line error term which is updated after each pixel of the line is drawn to determine selection of a next pixel of the line;

circuitry for storing said calculated line parameters;

circuitry for selectively modifying the contents of said storing circuitry to redefine the calculated line parameters in response to a control signal prior to updating the line error term;

circuitry for drawing a line based on the contents of said storing circuitry.

2. The circuitry of claim 1 wherein said circuitry for storing said calculated line parameters includes an addressable memory.

3. The circuitry of claim 2 wherein said circuitry or selectively modifying the contents of said storing circuitry includes interface circuitry for coupling said addressable memory to a processing unit.

4. The circuitry of claim 1 wherein said circuitry for receiving parameters defining first and second endpoints of a line includes circuitry for receiving first and second endpoint coordinates.

5. The circuitry of claim 4 wherein said first and second endpoint coordinates each include X and Y coordinates.

6. The circuitry of claim 1 wherein said line drawing circuitry includes circuitry for generating addresses of pixel coordinates comprising the line.

7. The circuitry of claim 1 wherein said line parameters include a Bresenham line error term and a slope term and wherein said circuitry for selectively modifying the contents of said storing circuitry includes circuitry for calculating a new Bresenham line error term based on said slope term.

8. The circuitry of claim 7 wherein said circuitry for calculating line parameters based on said first and second endpoints includes a processing unit in communication with said storing circuitry.

9. The circuitry of claim 1 wherein said line parameters further include a pixel count term defining the number of pixels to be drawn and wherein said circuitry for selectively modifying the contents of said storing circuitry includes circuitry for calculating pattern parameters and for modifying said pixel count term.

10. The circuitry of claim 1 wherein said circuitry for selectively modifying the contents of said Storing circuitry includes circuitry for enabling said line drawing circuitry after modifying the contents of said circuitry for storing said calculated line parameters.

11. The circuitry of claim 1 wherein said drawing circuitry comprises circuitry for generating addresses of pixel coordinates comprising the line.

12. A method of drawing lines in a computer, comprising the steps of:

receiving parameters defining first and second endpoints of a line;

calculating line parameters defining a line based on said first and second endpoints, wherein said calculated line parameters include a line error term which is updated after each pixel of the line is drawn to determine selection of a next pixel of the line;

responsive to a control signal, selectively allowing line parameters to be modified prior to drawing a line based on said line parameters and prior to updating said line error term or drawing a line based on said calculated line parameters without modification of said line parameters.

13. The method of claim 12 further including the step of drawing a line responsive to a second control signal after modifying the line parameters.

14. The method of claim 13 wherein said step for calculating line parameters defining a line based on said first and second endpoints includes the step of calculating an error term and a slope term and wherein said step of selectively allowing line parameters to be modified includes the step of allowing modification of said error term responsive to said slope term.

15. The method of claim 13 wherein said step for calculating line parameters defining a line based on said first hand second endpoints includes the step of calculating a pixel count term defining the number of pixels to be written and wherein said step of selectively allowing said line parameters to be modified includes the step of calculating pattern parameters and allowing modification of said pixel count term responsive thereto.

16. The method of claim 12 wherein said step of receiving parameters defining first and second endpoints of a line comprises the step of receiving first and second endpoint coordinates.

17. The method of claim 16 wherein said step of receiving first and second endpoint coordinates includes the step of receiving first and second endpoint coordinates each including X and Y coordinates.

18. The method of claim 12 wherein said line drawing step includes the step of generating addresses of pixel coordinates comprising the line.

19. A computer system comprising:

a central processing unit;

a display; and a graphics processor for drawing a line comprised of a plurality of pixels coupled to said central processor and said display, said graphics processor including:

circuitry for receiving parameters defining first and second endpoints of a line;

circuitry for calculating line parameters based on said first and second endpoints, wherein said calculated line parameters include a line error term which is updated after each pixel of the line is drawn to determine selection of a next pixel of the line;

circuitry for storing said calculated line parameters;

circuitry for selectively modifying the contents of said storing circuitry in response to a control signal prior to updating the line error term; and circuitry for drawing a line based on the contents of said storing circuitry.

20. The circuitry of claim 19 wherein said circuitry for storing said calculated line parameters includes an addressable memory.

21. The circuitry of claim 20 wherein said modifying circuitry comprises interface circuitry for coupling said memory to a processing unit.

* * * * *

UNITED STATES PATENT AND TRADEMARK OFFICE
CERTIFICATE OF CORRECTION

PATENT NO. : 5,613,054
DATED : March 18, 1997
INVENTOR(S) : Albers, et. al.

It is certified that error appears in the above-indentified patent and that said Letters Patent is hereby corrected as shown below:

Column 2, line 9, delete "draw", insert --drawn--.
Column 4, line 2, delete "detailed", insert -- detail--.
Column 9, line 32, delete "t", insert "T".
Column 15, line 19, delete "draw", insert --drawn--.
Column 15, line 48, delete "or", insert --for--.
Column 16, line 44, delte "hand", insert --and--.

Signed and Sealed this

First Day of July, 1997

Attest:

BRUCE LEHMAN

*Attesting Officer*  *Commissioner of Patents and Trademarks*